US010621623B2

(12) United States Patent
Zhu et al.

(10) Patent No.: US 10,621,623 B2
(45) Date of Patent: Apr. 14, 2020

(54) USING INTERPOLATION BASED ON HISTORICAL DATA TO GENERATE A TIME-AGNOSTIC SCORING FOR USERS IN AN ONLINE SYSTEM

(71) Applicant: Facebook, Inc., Menlo Park, CA (US)

(72) Inventors: Zhengyong Zhu, San Jose, CA (US); Jiajin Yu, Fremont, CA (US); Spencer Powell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 633 days.

(21) Appl. No.: 15/417,869

(22) Filed: Jan. 27, 2017

(65) Prior Publication Data

US 2018/0218406 A1   Aug. 2, 2018

(51) Int. Cl.
*G06Q 30/00*   (2012.01)
*G06Q 30/02*   (2012.01)

(52) U.S. Cl.
CPC ..... *G06Q 30/0269* (2013.01); *G06Q 30/0246* (2013.01); *G06Q 30/0272* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2003/0149622 A1* | 8/2003 | Singh | G06Q 30/02 705/14.48 |
| 2012/0158954 A1* | 6/2012 | Heffernan | H04L 43/04 709/224 |
| 2018/0137541 A1* | 5/2018 | Yelton | G06Q 30/0272 |

* cited by examiner

*Primary Examiner* — Michael W Schmucker
(74) *Attorney, Agent, or Firm* — Fenwick & West LLP

(57) ABSTRACT

An online system scores campaign audiences based on historical scoring data for similar audiences. A third party system selects a target audience and a day on which the target audience should be exposed to a campaign. The online system generates an availability grid and a score grid to determine a score for the target audience. Values in the availability grid are determined based on the availability of exposure time for the target audience on the specified date. Values in the score grid are based on historical scoring data for the same audience. The online system scores the target audience by interpolating between data points in the score grid based on a selected availability from the availability grid.

17 Claims, 4 Drawing Sheets

$$S_A = S_1 + \Delta_{imp}(AA') * S'$$

305

| Pacing Multiplier | Reach | Impressions |
|---|---|---|
| 0.2 | 1 | 5 |
| 0.3 | 2 | 15 |
| 0.5 | 3 | 22 |
| 0.7 | 4 | 26 |
| 0.8 | 5 | 35 |

315

| Reach | Impressions | Score |
|---|---|---|
| 1 | 10 | 10 |
| 2 | 12 | 17 |
| 3 | 15 | 20 |
| 4 | 32 | 58 |
| 5 | 34 | 70 |

$$S_A = S_1 + \Delta_{imp}(AA') * S'$$

USING INTERPOLATION BASED ON HISTORICAL DATA TO GENERATE A TIME-AGNOSTIC SCORING FOR USERS IN AN ONLINE SYSTEM

BACKGROUND

This disclosure relates generally to using interpolation for scoring, and in particular to basing scores on interpolations of historic score data.

Users in an online system may be scored or valued according to various performance metrics. The score of the user may provide information to a third party regarding the user's behavior and expected response in the online system, such as response to a content item of the third party that is presented to the user in the online system. The third party system may be able to select these users for receiving content based on their performance scores. However, in some cases, the scores for users vary significantly, and a third party system may encounter groups of users with highly differentiated scores based on the point in time in which the third party system makes the user selection. This may create a situation where the users for one third party system are scored low for receiving content of those systems, while the users for another third party system are scored much higher for receiving content of those systems. Such an inequity in scores may not be desirable, as the overall selection of users may be skewed and not balanced for the different third party systems. Thus, a more stable scoring or valuation system for valuing users for display of content in an online system is desired.

SUMMARY

A method for generating stable scores for third party systems is described. An online system receives information about a target audience for content from a third party system. The online system generates an availability grid, indicating available reach and impression pairs for the target audience that may be reserved for content campaign exposure. In some embodiments, the third party system may reserve the target audience for exposure to a particular piece of content. In some embodiments, the third party system may reserve the target audience for exposure to multiple pieces of content from the third party system. Reach refers to a number of individual audience members who are exposed to a piece of content. A number of impressions refers to a number of times an audience member is exposed to a piece of content. Each reach and impression pair in the availability grid corresponds to a pacing multiplier value which controls how aggressively the third party bids for audience exposure. The pacing multiplier options are provided for the third party system and the online system receives a selected pacing multiplier value from the third party system.

A pair of reach and impression values that correspond to the selected pacing multiplier are determined based on the availability grid. The online system generates a score grid describing scores or values of the target audience on a selected date for some reach and impression values based on historical scoring data. A score is determined for the determined reach and impressions pair from the availability grid. In some embodiments, an interpolation between known historical scores for users is performed to determine a score for an available reach and impression pairing.

In one embodiment, the interpolation is computed between scores in the score grid based on a selected value from the availability grid. A point, A, is chosen from the availability grid and plotted on the score grid according to its associated reach and impression values. Points $S_1$ and $S_2$, which correspond to a historical reach and impression pair plotted on the score grid, are identified such that point A is between points $S_1$ and $S_2$. A point $S_0$, also representing a historical data point on the score grid, is identified such that it is associated with the next smallest reach value from a reach value associated with point $S_1$. A point S' on the score grid is determined such that S' is an orthogonal projection of the point A onto a line segment between $S_1$ and $S_2$. The online system calculates a value associated with the point S' that is an interpolation of the scores associated with the point $S_1$ and the point $S_2$, based on scores associated with $S_1$ and $S_2$, and based on a relative positioning of point S' between $S_1$ and $S_2$ on the score grid. A point A' is also determined, A' being located at an intersection of a line passing through point $S_1$ that is orthogonal to a line segment between $S_0$ and $S_1$, and a line passing through point A that is parallel to the line segment between $S_1$ and S'. A value, $\Delta_{imp}(AA')$, that is based on a change in impressions between the plotted locations of the points A and A' on the score grid is determined. The online system calculates a score, $S_A$, according based on an equation: $S_A = S_1 + \Delta_{imp}(AA') * S'$. The online system provides the determined score to the third party system. In some embodiments, the above calculations may be completed using mathematical relations to determine values, and without actually plotting the points on a grid.

Using such a method, each third party system is able to receive a score for a group of users that is time-agnostic, i.e., does not depend significantly upon when the third party system makes the request for the users. The scores may affect the resources that a third party system needs to allocate in order to select the users, and so by creating a more stable score over time, the resource load on third party systems is equalized and not dependent upon time.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. System Architecture

Figure 1:
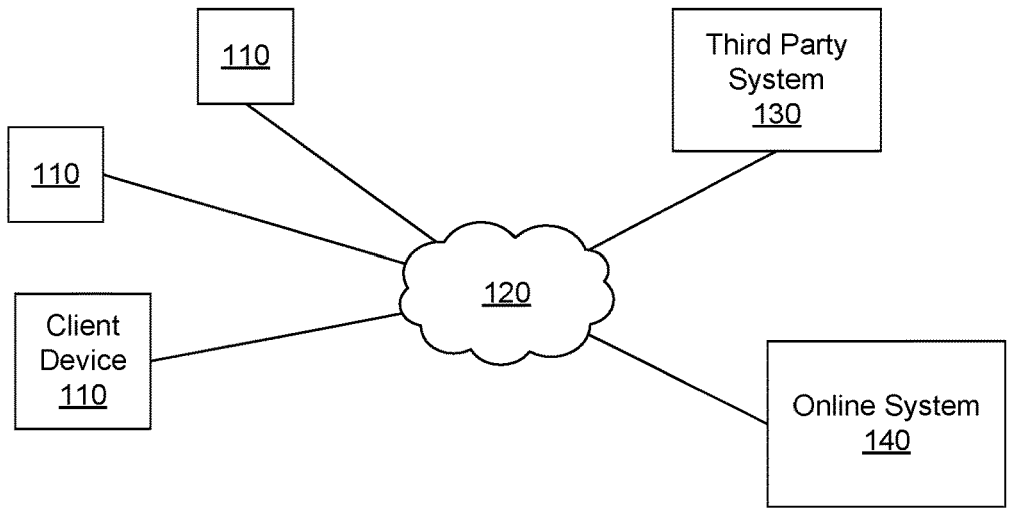
FIG. 1 is a block diagram of a system environment for an online system, in accordance with an embodiment.

FIG. 1 is a block diagram of a system environment 100 for an online system 140, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as content, or information about an application provided by the third party system 130.

Figure 2:
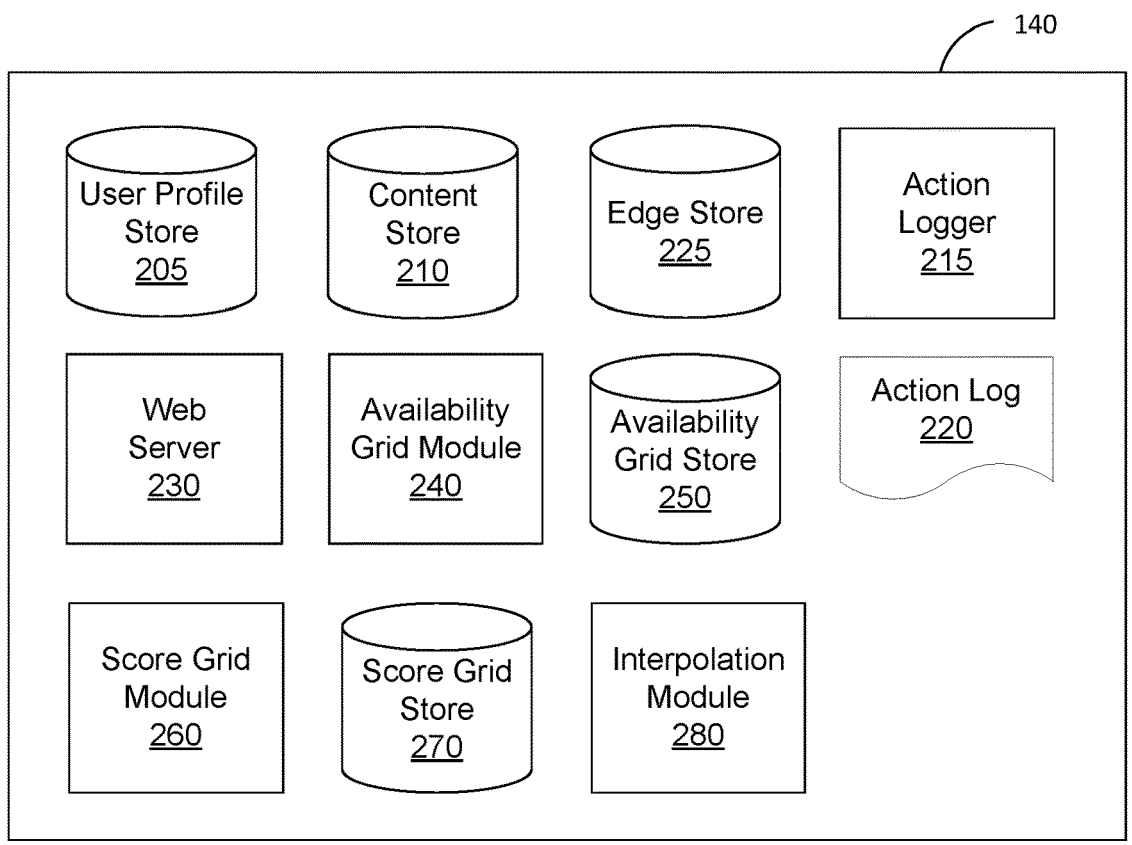
FIG. 2 is a block diagram of an architecture of an online system, in accordance with an embodiment.

FIG. 2 is a block diagram of an architecture of the online system 140, in accordance with an embodiment. The online system 140 shown in FIG. 2 includes a user profile store 205, a content store 210, an action logger 215, an action log 220, an edge store 225, an availability grid module 240, and availability grid store 250, a score grid module 260, a score grid store 270, an interpolation module 280, and a web server 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Availability Grid

The availability grid module 240 computes and updates values in availability grids. An availability grid is a chart that represents an amount of user reach and impressions to which a third party system 130 may elect to show content. In one embodiment, the availability grid module 240 creates availability grids that represent each user demographic for each day. For example, one availability grid might represent women between the ages of 22 and 35 to whom the online system 140 expects to be able to display content on December 12. The availability grid module 240 creates new availability grids and updates data associated with existing availability grids when the number of available users to display content to changes (e.g., a third party system 130 may reserve a certain number of the users within a specific demographic group on a specific day). More information about availability grids is explained in the detailed description of FIG. 3.

Availability grids and associated data are stored in the availability grid store 250. The availability grid store 250 stores information about availability grids that represent each demographic group for each future day for which the online system 140 is allowing third party systems 130 to book users. In some embodiments, availability grids may be stored and/or represented in ways other than as grids or charts. For example, availability grid data may be stored in tables, arrays, or as raw data.

Score Grid

The score grid module 260 computes and updates scores in score grids. Scores are used to determine a cost associated with available user reach and impressions. For example, a score in a score grid may represent a compensation the online system 140 requests from a third party system 130 to present content to a specific reach and impression of users. Each score grid is a chart that represents historical values corresponding to specific reach and impression pairs. In one embodiment, the score grid module 260 creates score grids for each user demographic for each time window (e.g., day) that the online system 140 is allowing third party systems 130 to book users. More details about score grids is explained in the detailed description of FIG. 3.

Score grids created by the score grid module 260 are stored in the score grid store 270. Unlike availability grids, score grids are not altered after they are initially created for a particular day. Score grids are not updated after creation because they are based on historical data which does not change. Basing score values on historical data ensures that a first third party system 130 does not have to provide more compensation (beyond a significant threshold) than another third party system 130 for the same reach and impression of a certain group of users if the first third party system reserves the users at a later time than the other third party system. In some embodiments, historical score values are chosen by an expert. In some embodiments, historical score values may be chosen by a computer program. In some embodiments, score grids may be stored and/or represented in ways other than as grids or charts. For example, score grid data may be stored in tables, arrays, or as raw data.

Interpolation Module

The interpolation module 280 combines current data from an availability grid and historical data in a score grid to determine a score that can be applied to a certain reach and impression pair. The interpolation module 280 uses an availability grid and score grid that correspond to the same time windows and user demographic group. More information about interpolation is included in the detailed description of FIG. 4.

The web server 230 links the online system 140 via the network 120 to the one or more client devices 110, as well as to the one or more third party systems 130. The web server 230 serves web pages, as well as other content, such as JAVA®, FLASH®, XML and so forth. The web server 230 may receive and route messages between the online system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, or BlackberryOS.

II. Score Determination

Figure 3:
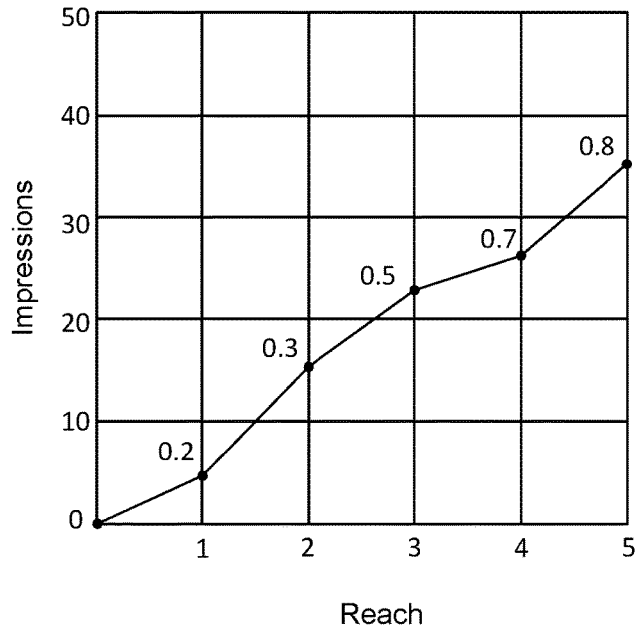
FIG. 3 is an example availability grid and score grid, in accordance with an embodiment.
Figure 3:
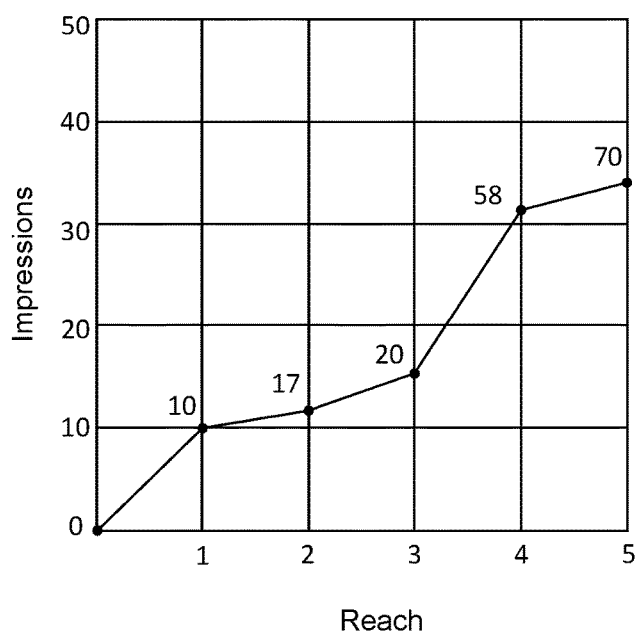

FIG. 3 is an example availability grid and score grid, in accordance with an embodiment. A table of values 305 includes pacing multipliers, and associated pairs of reach and impression quantities. The table of values 305 representing an availability grid 310 is kept updated according to current user availability. In one embodiment, the online system 140 computes the current number of users that are available for presentation of content (i.e., from a specific target audience and for a specific timeframe represented in the table 305). For each pacing multiplier, the online system 140 computes a set of corresponding reach and frequency values based on the pacing multiplier and the current availability. For example, for a pacing multiplier of 0.5, the online system 140 may determine that 3 users may be receive impressions 22 times. In one embodiment, each pacing multiplier value has a one-to-one mapping to a reach and impression pairing. A pacing multiplier may be a value between zero and one that is based on a rate at which a third party system 130 chooses to allocate resources when targeting users. In some embodiments, a resource for targeting users could be compensation. An availability grid 310 can be represented by a plotted line of reach and impression values.

Another table of values 315 represents a score grid 320. The table of values 315 representing a score grid 320 is generated once according to historical data and is not changed after its initial creation. In one embodiment, the online system 140 determines scores associated with historical reach and impression pairs. For example, the online system 140 may identify the reach and impression pairs that were allocated for the same target audience on the same day the previous year. For each historical reach and impression pair, the online system 140 also determines a corresponding score (e.g., a score that was previously used for the same reach impression pair for the target audience). For example, in the past, 4 users may have received 32 impressions with a score of 58. The table of values 315 associated with the score grid 320 includes a one-to-one mapping between reach and impression pairs and scores. The score grid 320 may be represented by a plotted line of reach and impression values.

In one embodiment, the axes representing reach and impression in the availability grid 310 and the score grid 320 are identical. That is, the availability grid 310 and the score grid 320 may have axes that are scaled the same way and that respectively use the same units. The specific values and axis labels shown for the availability grid 310 and score grid 320 as depicted in FIG. 3 are provided as non-limiting examples. In some embodiments, the online system does not generate actual availability grids 310 or score grids 320, as calculations based on the data associated with the availability value table 305 and the score value table 315 may be performed mathematically. However, the availability grid 310 and score grid 320 are presented herein for ease of understanding.

Figure 4:
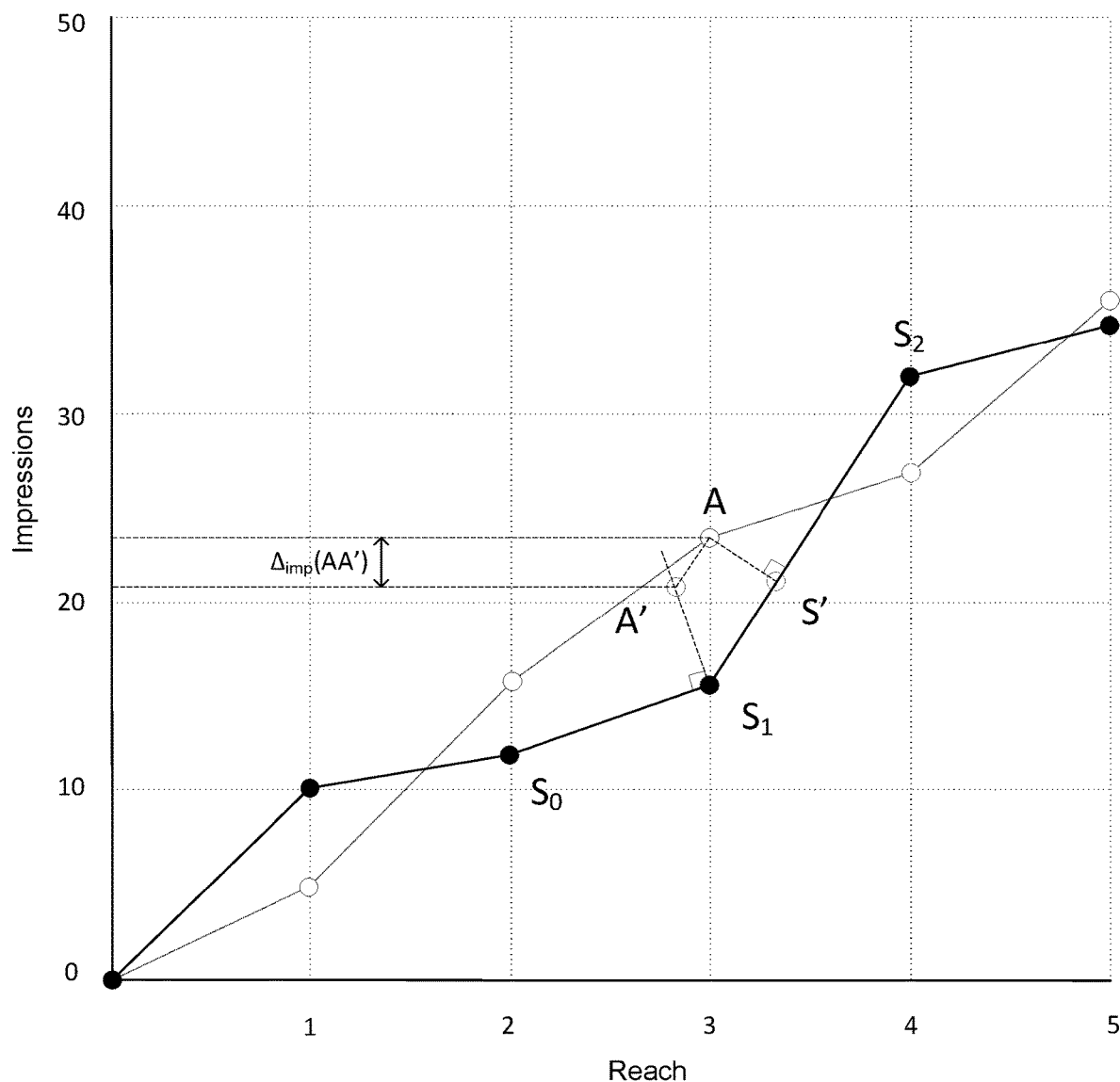
FIG. 4 presents an example of combining data from an availability grid and a score grid to determine an appropriate score, in accordance with an embodiment.

FIG. 4 presents an example of combining data from an availability grid 310 and a score grid 320 to determine an appropriate score, in accordance with an embodiment. In FIG. 4, the points from the availability grid 310 are overlaid on the score grid 320. Herein, the availability grid values are represented by white circles connected with a thinly dotted line. The score grid 320 values are represented by black circles connected with a solid line. In the example shown in FIG. 4, a third party system 130 has selected a pacing multiplier of 0.5, which corresponds to a point A on the availability grid 310 and represents a reach of 3 people with 22 views (impressions) per person.

The interpolation module 280 determines a score for availability point A. The interpolation process allows scores to be determined based on historical data, even when historical data for exact reach and impression pairs that are currently available on the availability grid 310 is not present in the corresponding score grid 320. Determining the score for availability A involves interpolating between score values that are nearest to A and that exist on the score grid 320. A score for availability A, is calculated based on the following equation:

$$S_A = S_1 + \Delta_{imp}(AA') * S' \quad (1)$$

Where $S_A$ is the score for availability A, and other values in equation 1 are based on the relationship between point A and the line defined on the score grid 320, as described below.

Data points $S_0$, $S_1$, and $S_2$ are selected from among the points on the score grid 320 such that A lies between $S_1$ and $S_2$ with respect to the impressions axis. Note that each point S increases in value on the y-axis compared to the previous point. The value of $S_1$ in equation 1 is the score associated with $S_1$ in the score grid 320 (e.g., 20 in this case). Point $S_0$ is the next point to the left of $S_1$ on the score grid 320 (i.e., the point with the next smallest reach value). The point S' is an orthogonal projection of the point A onto the line segment between points $S_1$ and $S_2$. The score associated with S' (as used in equation 1) is determined by interpolating the value based on the known scores of $S_1$ and $S_2$ and based the relative positioning of S' between $S_1$ and $S_2$. In other words, S' in equation (1) has the value of:

$$S' = (S_2 - S_1)\frac{\sqrt{(reach_{S'} - reach_{S_1})^2 + (imp_{S'} - imp_{S_1})^2}}{\sqrt{(reach_{S_2} - reach_{S_1})^2 + (imp_{S_2} - imp_{S_1})^2}} + S_1 \quad (2)$$

where $S_1$ and $S_2$ are the score values for points $S_1$ and $S_2$, respectively, $reach_{S'}$ represents the reach value (i.e., reach coordinate) for S', $imp_{S'}$ represents the impressions value (i.e., impressions coordinate) for S', and similarly for $S_1$ and $S_2$.

The reach and impression values for S' may be computed by:

$$\vec{S'} = \vec{S_1} + \frac{(\vec{A} - \vec{S_1}) \cdot (\vec{S_2} - \vec{S_1})}{|\vec{S_2} - \vec{S_1}|^2}(\vec{S_2} - \vec{S_1}) \quad (3)$$

where reach and impression pairs are represented as vectors that originate at zero reach and zero impressions (i.e., the origin of the score grid 320). That is, the vector $\vec{S'}$ represents the point on the score grid at coordinates ($reach_{S'}$, $imp_{S'}$), and similarly for the other vector representations in equation 3. Equation 3 represents a projection of a vector from point $S_1$ to point A (i.e., the vector $\vec{A}-\vec{S_1}$) onto a vector from point $S_1$ to point $S_2$ (i.e., the vector $\vec{S_2}-\vec{S_1}$). The projection is determined by finding a dot product of the vector $(\vec{A}-\vec{S_1})$ and the vector $(\vec{S_2}-\vec{S_1})$, dividing by the length of the vector $(\vec{S_2}-\vec{S_1})$, which is represented as $|\vec{S_2}-\vec{S_1}|$, and multiplying by a unit vector in direction of the vector from point $S_1$ to point $S_2$. The unit vector in the direction of the vector from point $S_1$ to point $S_2$ is the vector $(\vec{S_2}-\vec{S_1})$ divided by its length. The vector $\vec{S_1}$ is added to the result so that $\vec{S'}$ represents a correct positioning of the projection value with respect to the score grid.

A point A' is located at the intersection of a line passing through $S_1$ that is orthogonal to a line segment between $S_0$ and $S_1$, and a line passing through point A that is parallel to the line segment between $S_1$ and S'. The value of $\Delta_{imp}$(AA'), as used in equation 1, is the change in the impressions value between A and A' (i.e., $imp_A-imp_{A'}$). In other words, $\Delta_{imp}$(AA') is the change in the y axis between the points A and A'. The impression values for A' may be computed mathematically by determining the intersection of the two lines described above. The orthogonal line segment will have a slope that is the negative inverse of the slope of the line segment ($S_0$, $S_1$) and which has a y-intercept such that the line intersects at $S_1$. The parallel line has the same slope as ($S_1$, $S_2$) but instead intersects at point A. Solving the linear equations for these two lines grants the intersection point, which gives (reach$_{A'}$, imp$_{A'}$). Note that points plotted on the score grid, as in the example of FIG. 4, are included herein for the ease of explanation. In some embodiments, the same process may be achieved using a set of equations, such as those described above, and without explicitly plotting values on a grid.

A score calculated using equation 1, may be used to relate compensation provided by a third party system 130 to the online system 140 in exchange for presenting content to users in the selected target audience. Scoring in this way is advantageous in that scores for the same reach and impression values receive the same score, independent of when a third party system trades compensation for exposure of content to users. This allows for more equal competition among third party systems 130.

In some embodiments a score calculated by equation 1 is multiplied by a coefficient before it is presented to a third party system 130, for example, as a compensation value. The coefficient, r, is based on a comparison of historical scores with contemporary scores computed using equation 1, above. The value of the coefficient, r, is based on an equation:

$$\sum_i S_i = r \sum_i S_i' \quad (4)$$

where i is a count of a number of reservations for a user or group of users to receive content from the online system 100 within a timeframe, $S_i$ is s score value determined using some alternate scoring scheme, and $S_i'$ is a score value calculated using the scoring scheme described herein. A value for the coefficient r may be determined by computing the ratio of equation 4 over a certain time period (e.g., 3 weeks). A different coefficient may be computed for use within different time periods or for different target audiences. Subsequently multiplying scores computed with equation 1 by the corresponding coefficient ensures that a reach and impression pair does not receive a significantly lower score from the online system 100 than in the past. In one embodiment, the ratio value is used for testing purposes, as when the online system 100 transitions from one scoring scheme to another.

III. Example Flow

Figure 5:
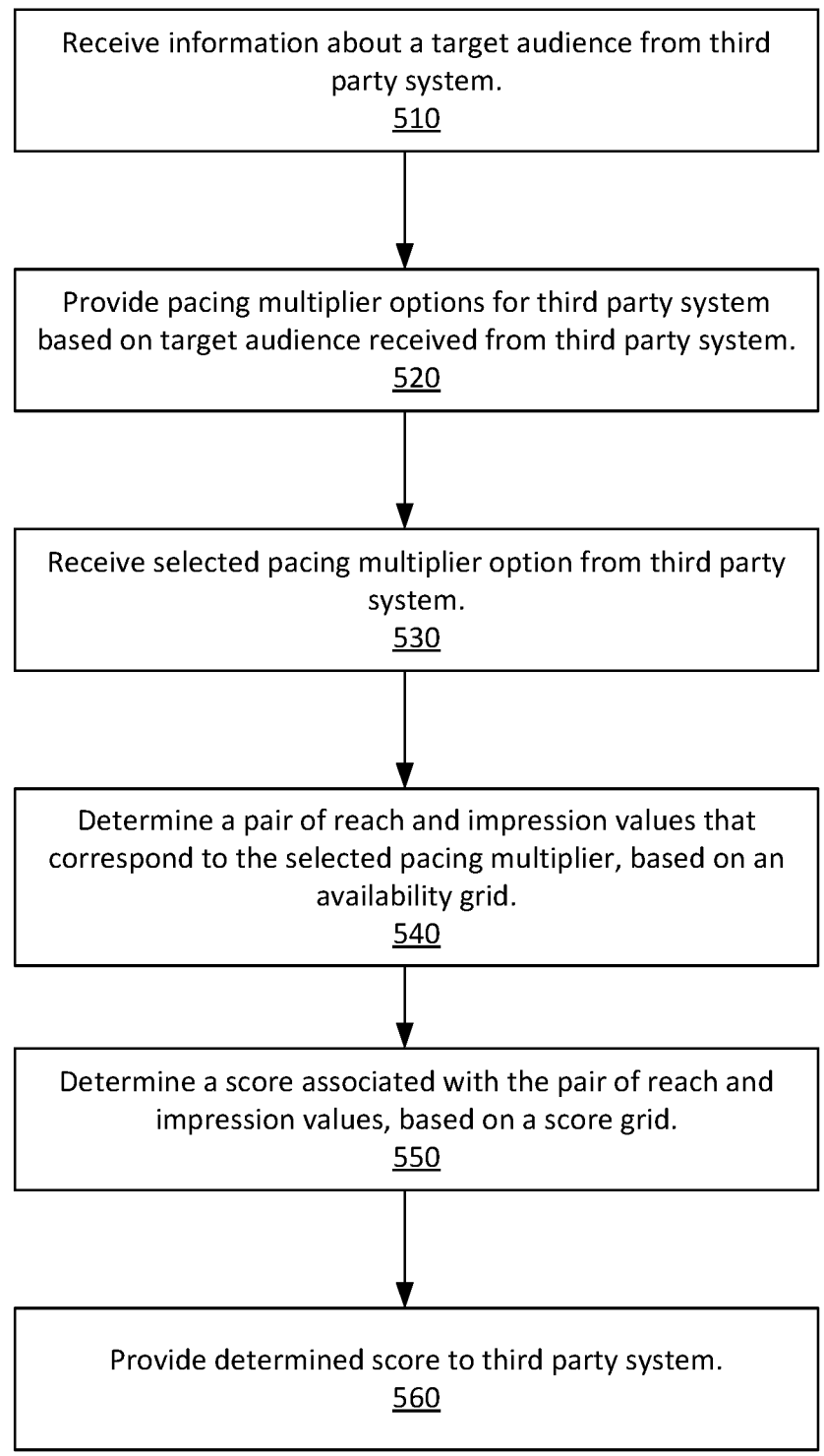
FIG. 5 is a flow chart describing a process for determining a score associated with a pacing multiplier selected by a third party system, in accordance with an embodiment.

FIG. 5 is a flow chart describing a process for determining a score associated with a pacing multiplier selected by a third party system, in accordance with an embodiment. The online system 140 receives 510 information about a desired target audience from a third party system 130. In some embodiments, the online system receives a content item or a set of content items that the third party system 130 wants the online system 140 to present to the target audience. In one embodiment, the third party system 130 selects a target audience to receive specific content on a specific day, or within some specified time period. The online system generates an availability grid 310 and a pricing grid 320 for the selected target audience. In some embodiments, the availability grid 310 and pricing grid 320 were previously generated. The online system provides 520 the third party system with available pacing multiplier options based on the received target audience and time window. The online system 140 receives 530 a pacing multiplier selection from the third party system.

A pair of reach and impression values that correspond to the selected pacing multiplier is determined 540 by the interpolation module 280 based on an availability grid 310. The interpolation module 280 determines 550 a score associated with the determined reach and impression values, based on a score grid 320. In some embodiments, determining the score involves interpolating between known values on the score grid 320 and calculating a score using equation 1 above. The determined score is provided 560 to the third party system 130 by the online system 140.

IV. Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
   generating, at an online system, an availability grid that includes a mapping between pacing multiplier values and reach and impression values for a target audience, wherein a pacing multiplier is a value based on a rate at which a third party system chooses to allocate resources;
   generating a score grid that includes a mapping between reach and impression values for a target audience and scores for each reach and impression value combination;
   receiving a selection of a pacing multiplier from a third party system, the pacing multiplier selected from the availability grid;
   selecting a point, A, from the availability grid and plotting it on the score grid;
   determining points $S_1$ and $S_2$ on the score grid such that point A is between points $S_1$ and $S_2$ on the score grid;
   determining a point $S_0$ on the score grid that has the next smallest reach value from the reach value associated with $S_1$;
   determining a point S' that is an orthogonal projection of the point A onto a line segment between $S_1$ and $S_2$;
   calculating a value associated with the point S' that is an interpolation of the scores associated with the point $S_1$ and the point $S_2$, based on scores of $S_1$ and $S_2$ and a relative positioning of point S' between $S_1$ and $S_2$;
   determining a point A' located at an intersection of a line passing through $S_1$ that is orthogonal to a line segment between $S_0$ and $S_1$, and a line passing through point A that is parallel to the line segment between $S_1$ and S';
   determining a value of $\Delta_{imp}AA'$ that is based on a change in impressions between the plotted locations of the points A and A'; and
   determining a score SA according to $SA=S1+\Delta_{imp}AA'*S'$.

2. The computer-implemented method of claim 1, wherein a mapping between reach and impression values for a target audience is a one-to-one mapping.

3. The computer-implemented method of claim 1, wherein the target audience is a particular demographic group within a specified timeframe.

4. The computer-implemented method of claim 3, wherein the specified time frame is one day.

5. The computer-implemented method of claim 1, wherein reach and impression values for a target audience on a score grid are based on historical reach and impression values for the target audience.

6. The computer-implemented method of claim 1, wherein score values on a score grid for a target audience are based on historical score values associated with historical reach and impression values for the target audience.

7. A non-transitory computer-readable storage medium storing executable computer program instructions, the computer program instructions comprising instructions for:
   generating, at an online system, an availability grid that includes a mapping between pacing multiplier values and reach and impression values for a target audience, wherein a pacing multiplier is a value based on a rate at which a third party system chooses to allocate resources;
   generating a score grid that includes a mapping between reach and impression values for a target audience and scores for each reach and impression value combination;
   receiving a selection of a pacing multiplier from a third party system, the pacing multiplier selected from the availability grid;
   selecting a point, A, from the availability grid and plotting it on the score grid;
   determining points $S_1$ and $S_2$ on the score grid such that point A is between points $S_1$ and $S_2$ on the score grid;
   determining a point $S_0$ on the score grid that has the next smallest reach value from the reach value associated with $S_1$;
   determining a point S' that is an orthogonal projection of the point A onto a line segment between $S_1$ and $S_2$;
   calculating a value associated with the point S' that is an interpolation of the scores associated with the point $S_1$ and the point $S_2$, based on scores of $S_1$ and $S_2$ and a relative positioning of point S' between $S_1$ and $S_2$;
   determining a point A' located at an intersection of a line passing through $S_1$ that is orthogonal to a line segment between $S_0$ and $S_1$, and a line passing through point A that is parallel to the line segment between $S_1$ and S';
   determining a value of $\Delta_{imp}AA'$ that is based on a change in impressions between the plotted locations of the points A and A'; and
   determining a score SA according to $SA=S1+\Delta_{imp}AA'*S'$.

8. The non-transitory computer-readable storage medium of claim 7, wherein a mapping between reach and impression values for a target audience is a one-to-one mapping.

9. The non-transitory computer-readable storage medium of claim 7, wherein the target audience is a particular demographic group within a specified timeframe.

10. The non-transitory computer-readable storage medium of claim 9, wherein the specified time frame is one day.

11. The non-transitory computer-readable storage medium of claim 7, wherein reach and impression values for a target audience on a score grid are based on historical reach and impression values for the target audience.

12. The non-transitory computer-readable storage medium of claim 7, wherein score values on a score grid for a target audience are based on historical score values associated with historical reach and impression values for the target audience.

13. A computer system, comprising:
one or more computer processors for executing computer program instructions; and
a non-transitory computer-readable storage medium storing instructions executable by the one or more computer processors to perform steps comprising:
generating, at an online system, an availability grid that includes a mapping between pacing multiplier values and reach and impression values for a target audience, wherein a pacing multiplier is a value based on a rate at which a third party system chooses to allocate resources;
generating a score grid that includes a mapping between reach and impression values for a target audience and scores for each reach and impression value combination;
receiving a selection of a pacing multiplier from a third party system, the pacing multiplier selected from the availability grid;
selecting a point, A, from the availability grid and plotting it on the score grid;
determining points $S_1$ and $S_2$ on the score grid such that point A is between points $S_1$ and $S_2$ on the score grid;
determining a point $S_0$ on the score grid that has the next smallest reach value from the reach value associated with $S_1$;
determining a point S' that is an orthogonal projection of the point A onto a line segment between $S_1$ and $S_2$;
calculating a value associated with the point S' that is an interpolation of the scores associated with the point $S_1$ and the point $S_2$, based on scores of $S_1$ and $S_2$ and a relative positioning of point S' between $S_1$ and $S_2$;
determining a point A' located at an intersection of a line passing through $S_1$ that is orthogonal to a line segment between $S_0$ and $S_1$, and a line passing through point A that is parallel to the line segment between $S_1$ and S';
determining a value of $\Delta_{imp}AA'$ that is based on a change in impressions between the plotted locations of the points A and A'; and
determining a score SA according to SA=S1+ $\Delta_{imp}AA'*S'$.

14. The computer system of claim 13, wherein a mapping between reach and impression values for a target audience is a one-to-one mapping.

15. The computer system of claim 13, wherein the target audience is a particular demographic group within a specified timeframe.

16. The computer system of claim 15, wherein the specified time frame is one day.

17. The computer system of claim 13, wherein reach and impression values for a target audience on a score grid are based on historical reach and impression values for the target audience.

* * * * *